(12) United States Patent (10) Patent No.: US 9,740,691 B2
McCann (45) Date of Patent: Aug. 22, 2017

(54) INTERSPECIES LANGUAGE WITH ENABLING TECHNOLOGY AND TRAINING PROTOCOLS

(71) Applicant: John Archibald McCann, Chevy Chase, MD (US)

(72) Inventor: John Archibald McCann, Chevy Chase, MD (US)

( * ) Notice: Subject to any disclaimer, the term of this patent is extended or adjusted under 35 U.S.C. 154(b) by 331 days.

(21) Appl. No.: 13/847,465

(22) Filed: Mar. 19, 2013

(65) Prior Publication Data

US 2014/0200877 A1 Jul. 17, 2014

Related U.S. Application Data

(60) Provisional application No. 61/612,870, filed on Mar. 19, 2012.

(51) Int. Cl.
*G06F 17/28* (2006.01)
*G10L 21/16* (2013.01)
(Continued)

(52) U.S. Cl.
CPC ............ *G06F 17/289* (2013.01); *G09B 5/04* (2013.01); *G09B 19/04* (2013.01); *G10L 21/16* (2013.01); *A01K 15/02* (2013.01)

(58) Field of Classification Search
CPC ......... G10L 21/06; G10L 21/10; G10L 21/16; A01K 15/02; G09B 19/04; G09B 19/06; G09B 21/005; G09B 21/006; G09B 21/007; G09B 21/008; G09B 5/02; G09B 5/04; G09B 5/06; G06F 17/289
(Continued)

(56) References Cited

U.S. PATENT DOCUMENTS 4,245,587 A * 1/1981 Cooper ................ A01K 15/025
119/712
4,315,482 A * 2/1982 Cooper ................ A01K 15/025
119/712
(Continued)

FOREIGN PATENT DOCUMENTS

JP EP 1355287 A1 * 10/2003 ............. G09B 19/06

*Primary Examiner* — John Villecco

(57) ABSTRACT

The Interspecies Language (ISL) is a method for communicating that includes a visual language, as tonal language, a training protocol that integrates them, and an enabling apparatus. The ISL visual language communicates through a display that creates a "picture" of a sentence on a touchscreen. This visual display embodies the ISL's syntax and structures how the user employs it to build sentences. Sentences are constructed by dragging icons, which are pictures or abstract images representing objects or concepts, into the structured areas of the visual array. The ISL tonal language communicates through a structured series of tones that are grouped so that tones within a grouping are members of a class of objects or concepts. The tones are sounded when an icon is placed into the visual array in the course of building a sentence. The ISL is deployed through an apparatus that includes a touchscreen, computer, chute, and industrial controls. With its clear structure for the animal's response, the ISL provides a method for meaningful, two-way communication between animals and humans or between humans.

14 Claims, 19 Drawing Sheets

ISL apparatus -- equipment

(51) Int. Cl.
    *G09B 19/04*     (2006.01)
    *G09B 5/04*     (2006.01)
    *A01K 15/02*     (2006.01)

(58) Field of Classification Search
    USPC ............. 704/3, 276; 434/116, 167, 176
    See application file for complete search history.

(56) References Cited

U.S. PATENT DOCUMENTS

| | | | | |
|---|---|---|---|---|
| 4,465,465 A * | 8/1984 | Nelson | ............... | G09B 21/00 340/4.13 |
| 5,169,342 A * | 12/1992 | Steele | ............... | G06F 3/0481 273/454 |
| 5,252,958 A * | 10/1993 | Daniels | ............... | G09G 3/003 119/719 |
| 5,299,125 A * | 3/1994 | Baker | ............... | G09B 21/00 434/112 |
| 5,392,735 A * | 2/1995 | Xitco, Jr. | ............... | A01K 15/02 119/712 |
| 6,022,222 A * | 2/2000 | Guinan | ............... | G09B 5/065 345/473 |
| 7,659,836 B2 * | 2/2010 | Novak | ............... | A61G 12/00 340/4.13 |
| 7,689,407 B2 * | 3/2010 | Yang | ............... | G09B 5/06 345/171 |
| 2003/0198921 A1 * | 10/2003 | Ueda | ............... | G09B 19/06 434/156 |
| 2003/0230248 A1 * | 12/2003 | Hotmer | ............... | A01K 15/02 119/718 |
| 2004/0083106 A1 * | 4/2004 | Rines | ............... | G10L 13/02 704/270 |
| 2004/0088164 A1 * | 5/2004 | Perlo | ............... | G10L 17/26 704/259 |
| 2004/0111272 A1 * | 6/2004 | Gao | ............... | G06F 17/289 704/277 |
| 2006/0040242 A1 * | 2/2006 | Mejia | ............... | G09B 17/00 434/170 |
| 2012/0240863 A1 * | 9/2012 | Araujo | ............... | A01K 5/02 119/51.01 |
| 2014/0278348 A1 * | 9/2014 | Tahan | ............... | G06F 17/28 704/7 |
| 2014/0295389 A1 * | 10/2014 | Izak | ............... | G09B 19/00 434/236 |
| 2015/0022329 A1 * | 1/2015 | Shani | ............... | A01K 29/00 340/286.01 |

* cited by examiner

FIG 01: ISL apparatus -- equipment
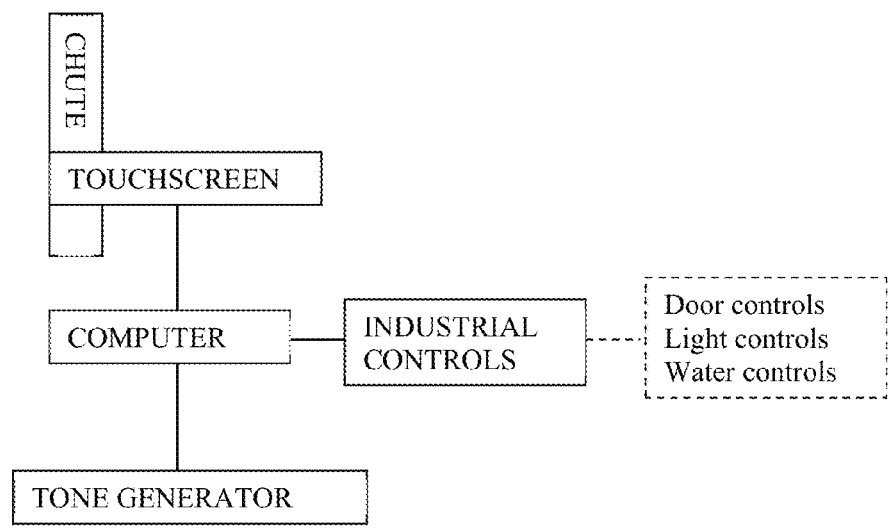

FIG 02: ISL spatial array
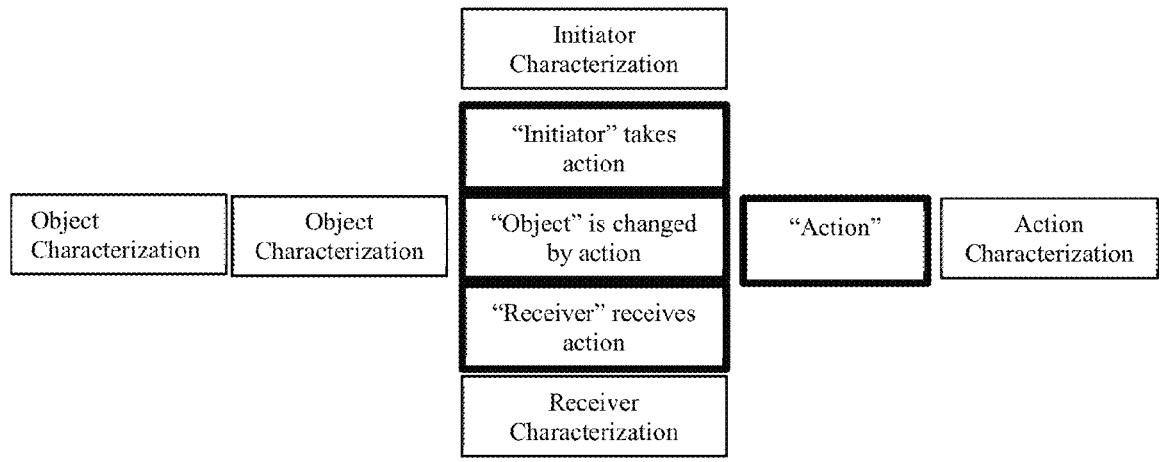
FIG 03: ISL word type
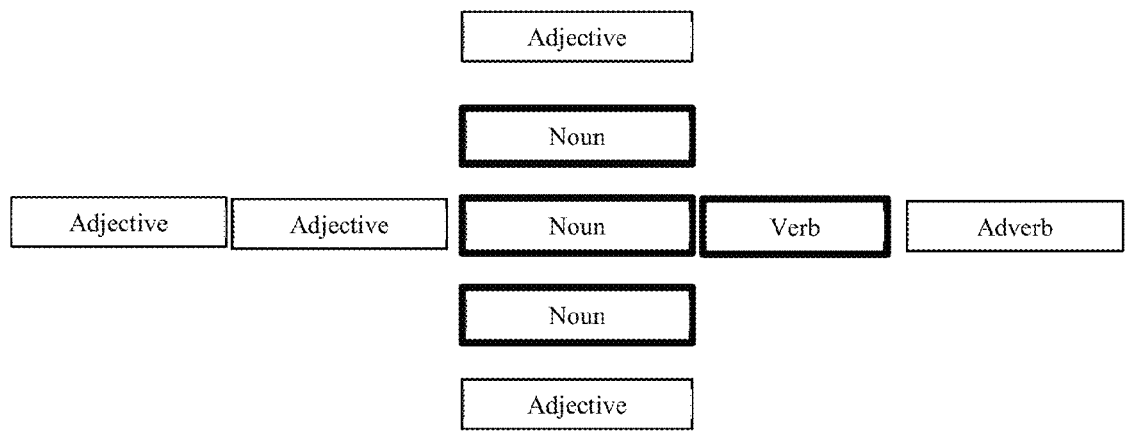

Figure 04: touchscreen ready for sentence construction
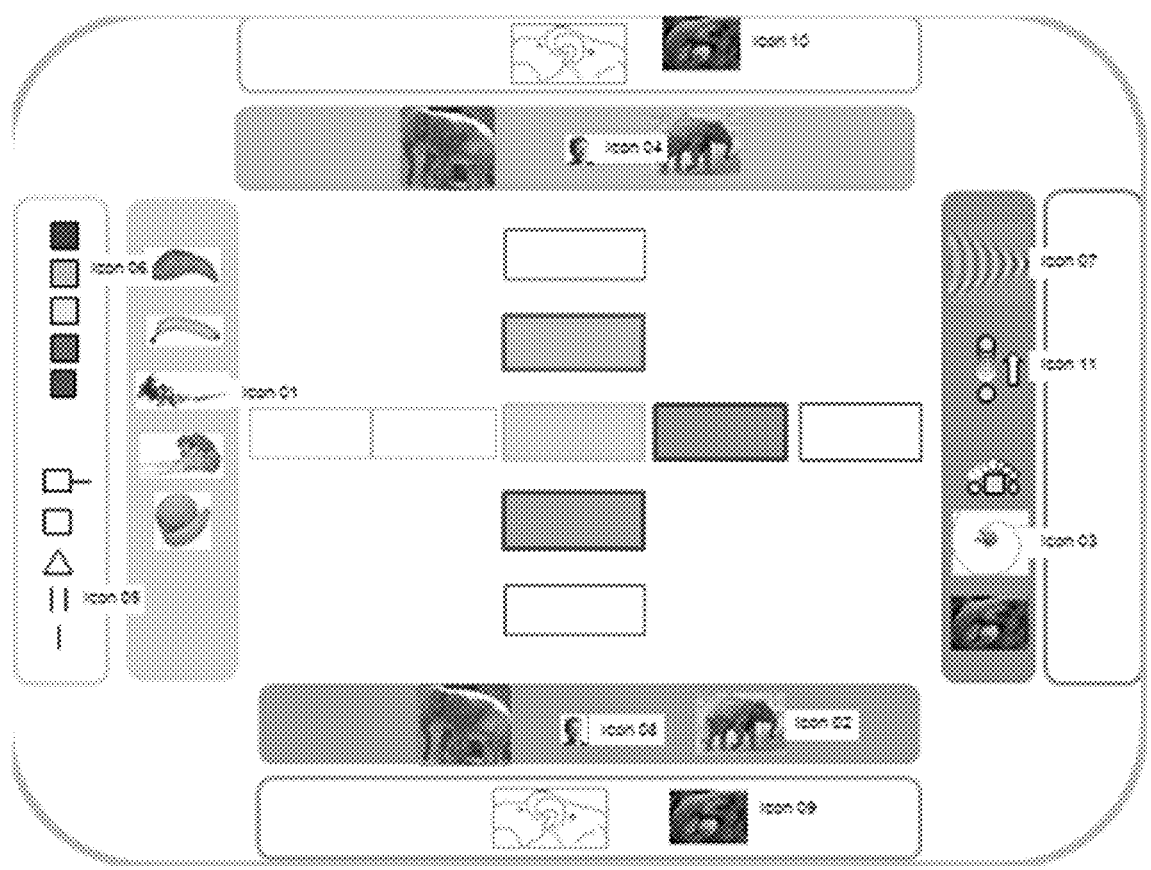

FIG 05: step 1 – object
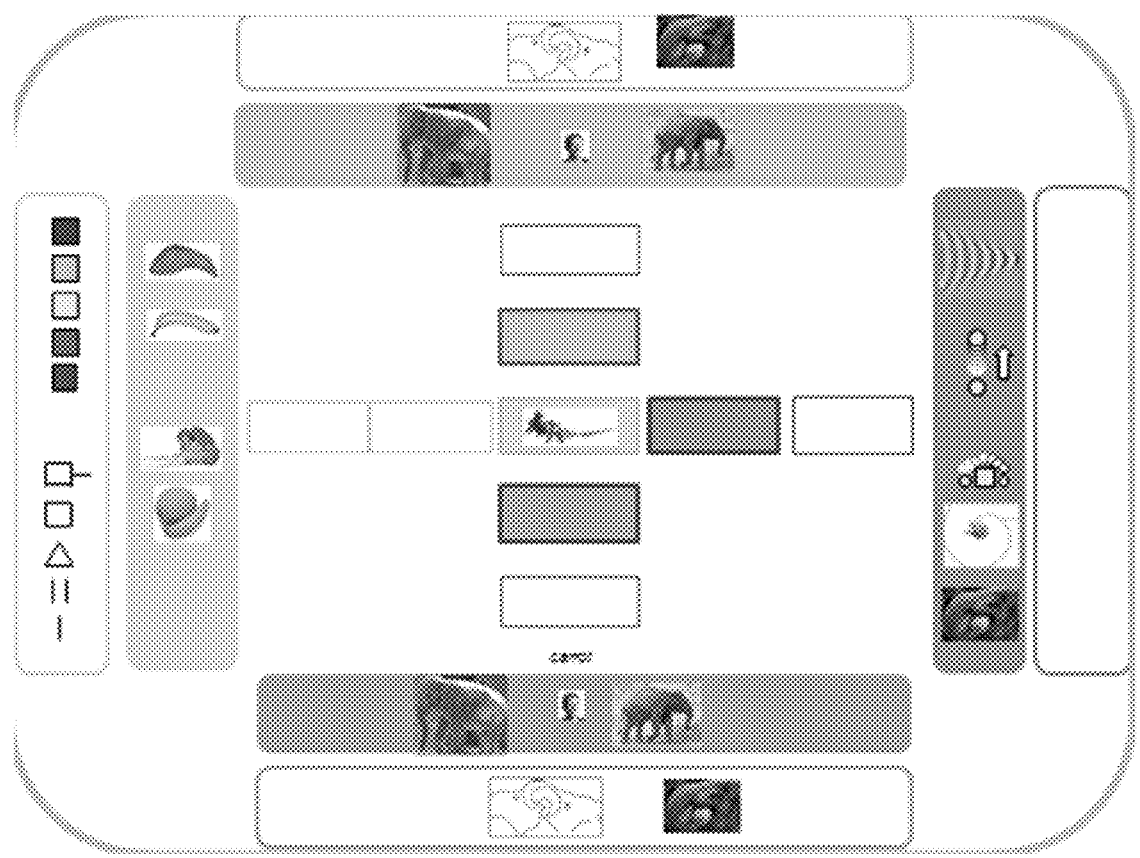

FIG 06: step 2 - receiver
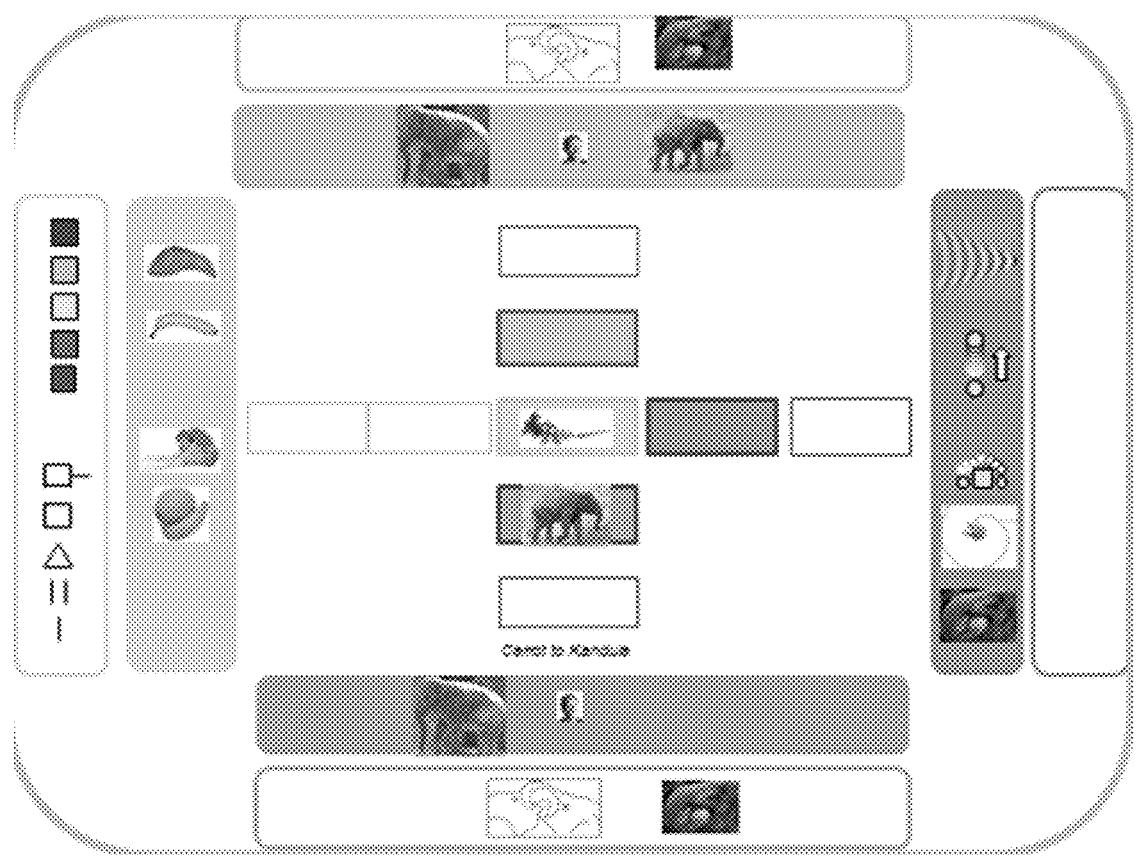

FIG 07: step 3 - action
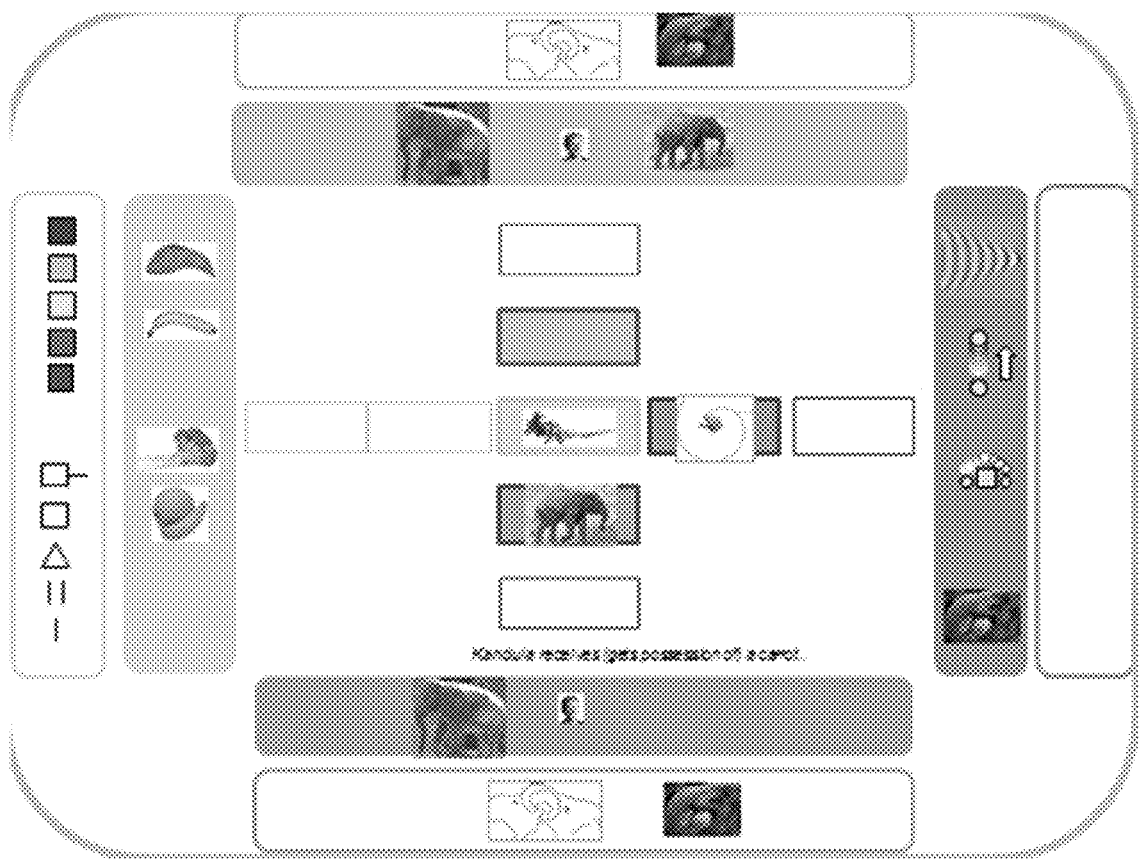

FIG 08: step 4 - initiator
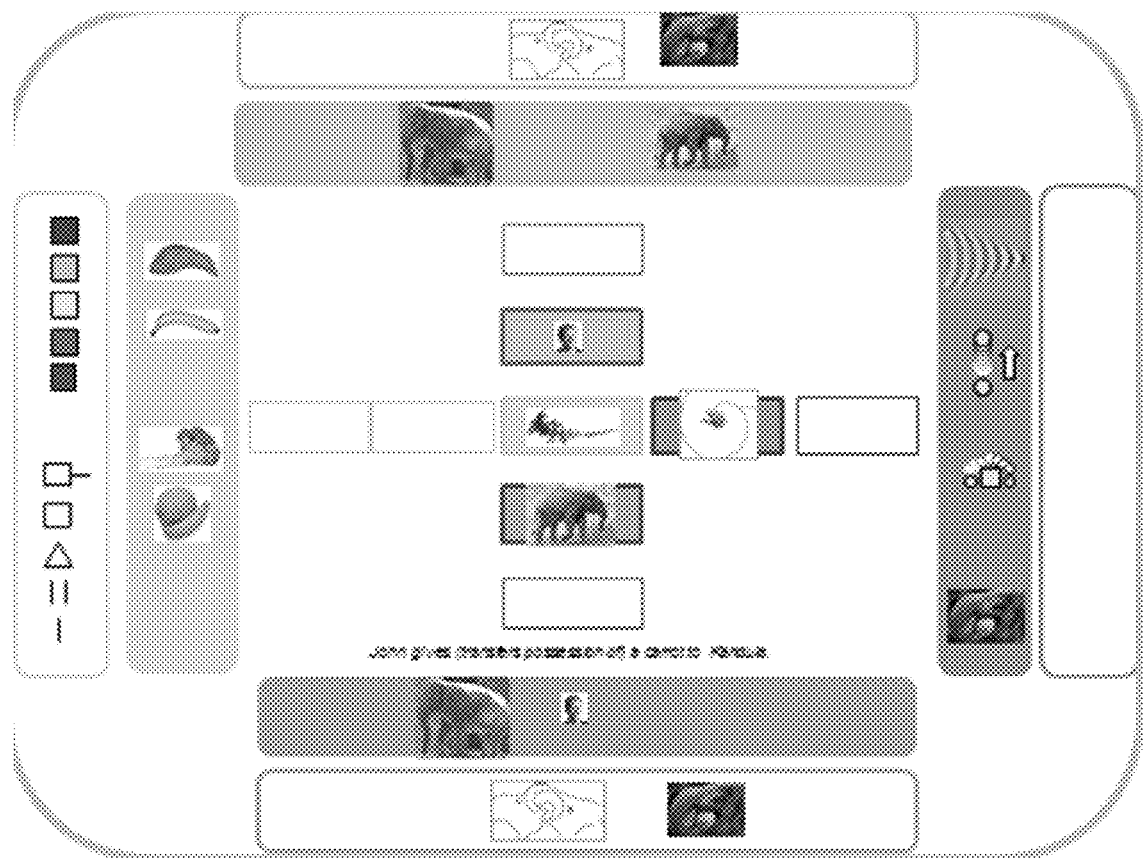

FIG 09: step 5 – object modifier
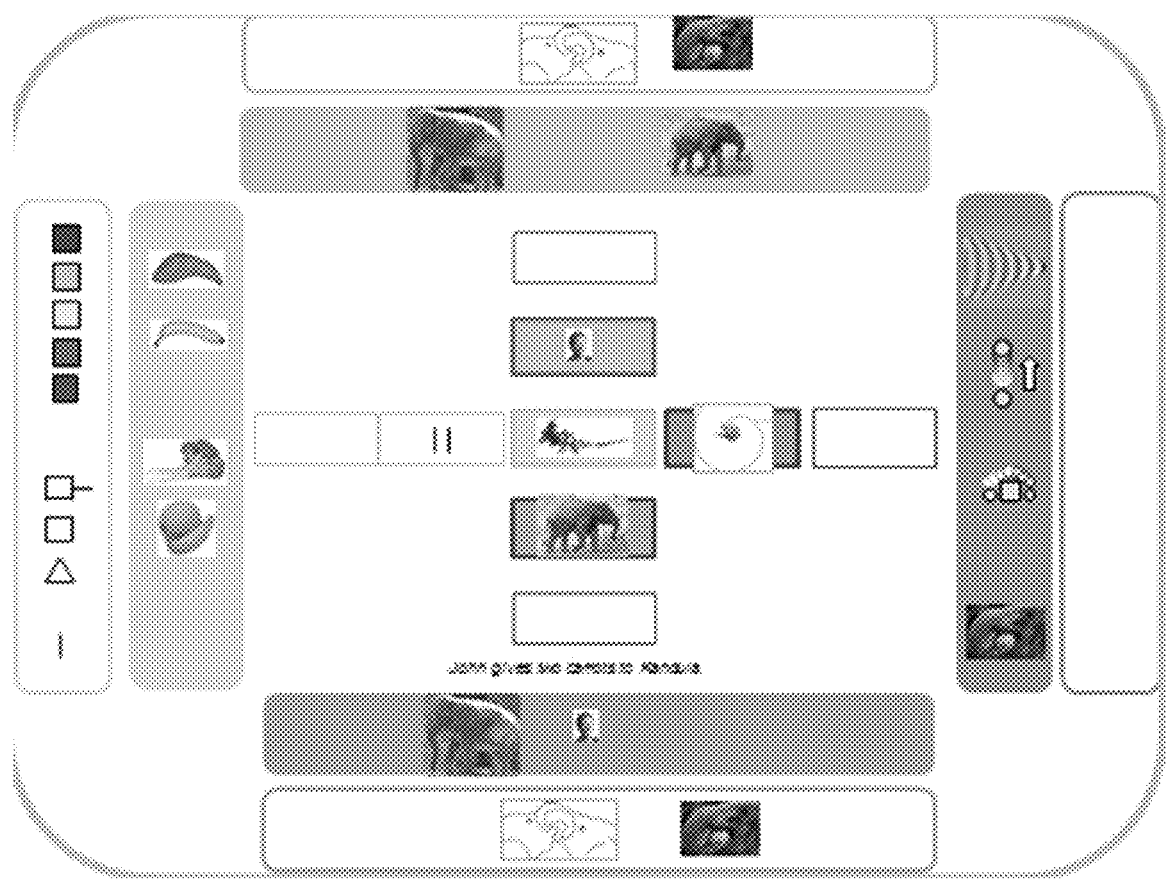

FIG 10: step 6 – additional modifiers
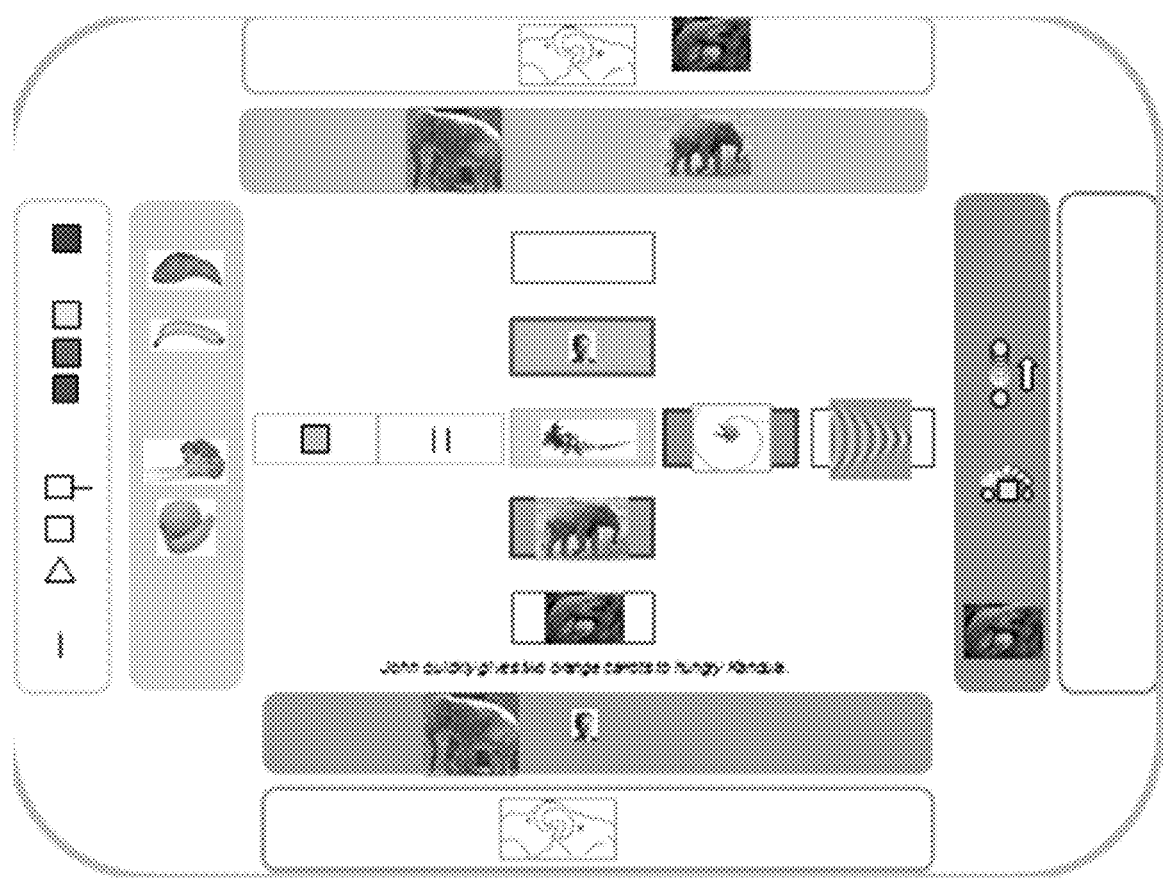

FIG 11: initiator as object
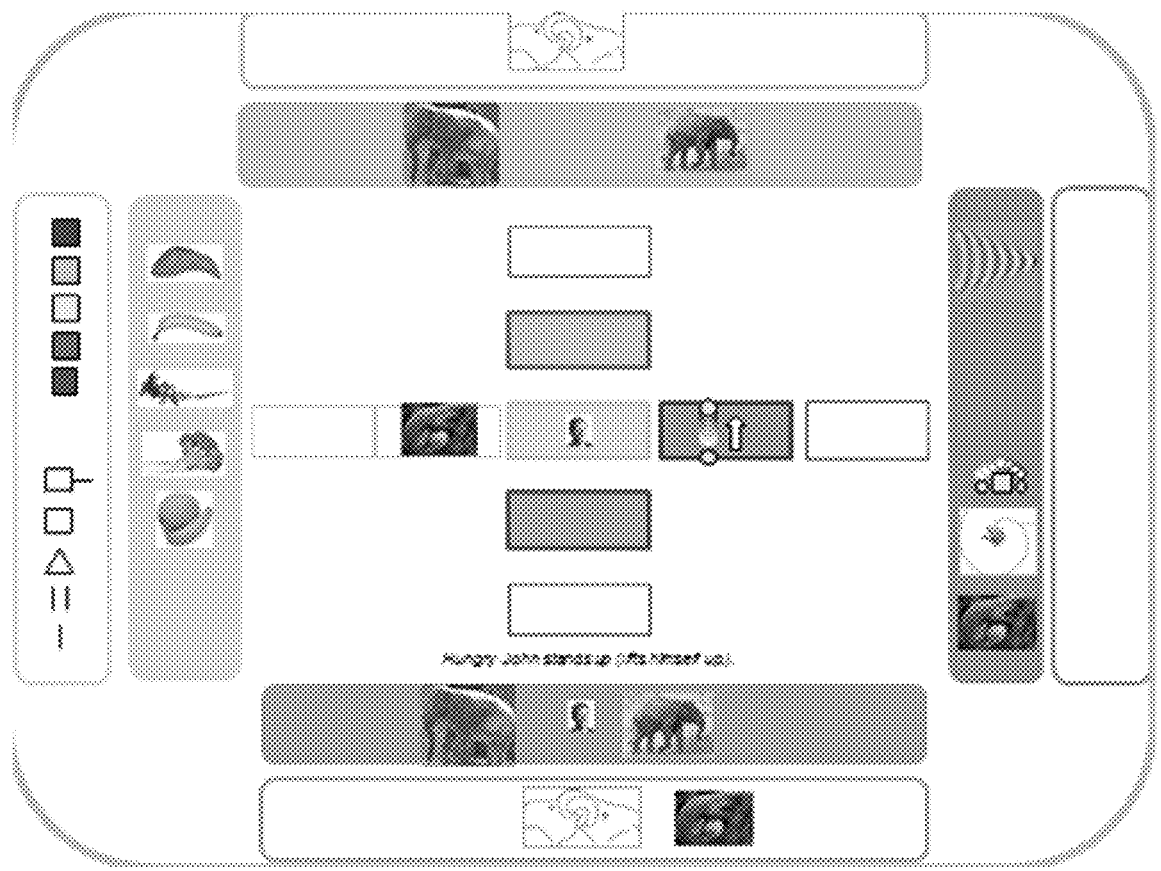

FIG 12: initiator acts on self
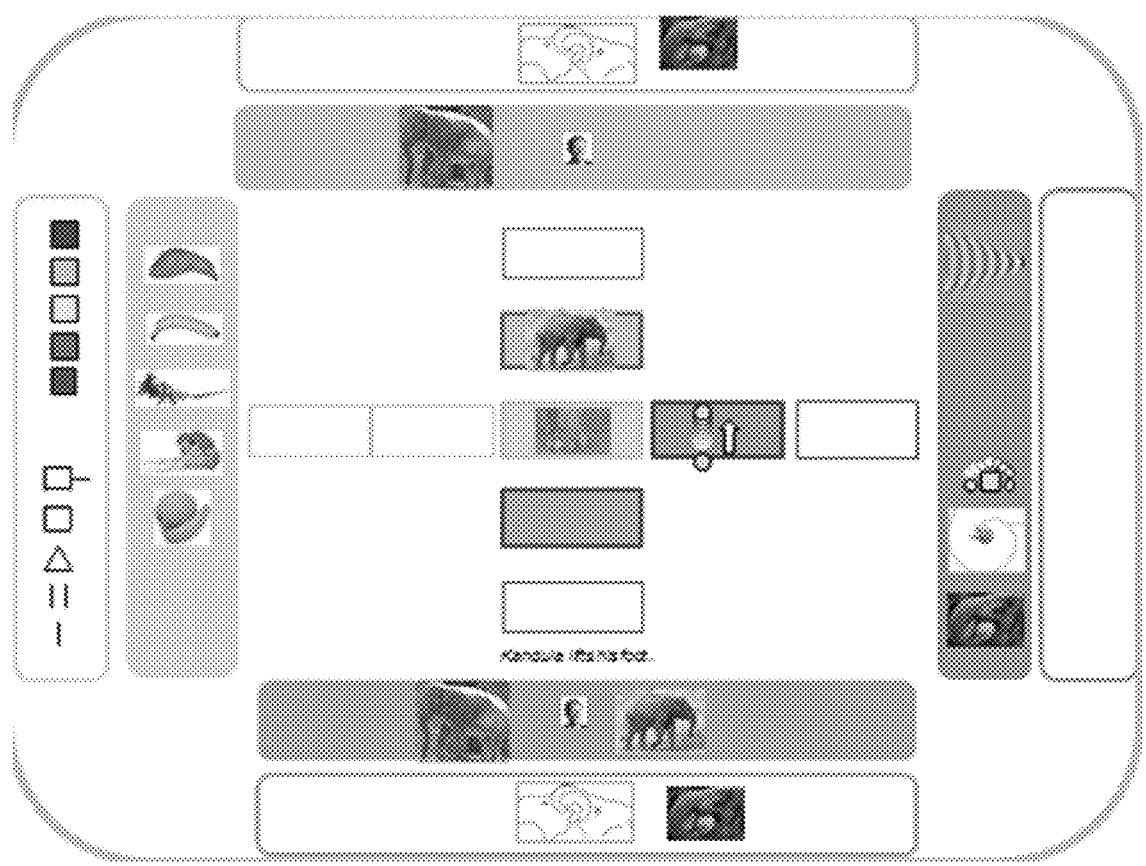

FIG 13: Example of tonal vocabulary

| 5T3 Plants | 5T3 Herbaceous | 6T1 Fruits | 6T2 Banana | 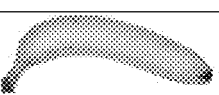 |
|---|---|---|---|---|
| 5T3 Plants | 5T3 Herbaceous | 6T1 Fruits | 6T1 Apple |  |
| 5T3 Plants | 5T3 Herbaceous | 6T1 Fruits | 5T4 Cantaloupe |  |
| 5T3 Plants | 5T3 Herbaceous | 6T1 Fruits | 5T3 Pumpkin |  |
| 5T3 Plants | 5T3 Herbaceous | 6T1 Fruits | 5T2 | |
| 5T3 Plants | 5T3 Herbaceous | 6T1 Fruits | 5T1 | |
| 5T3 Plants | 5T3 Herbaceous | 5T4 Green Vegetables | 6T4 | |
| 5T3 Plants | 5T3 Herbaceous | 5T4 Green Vegetables | 6T3 | |
| 5T3 Plants | 5T3 Herbaceous | 5T4 Green Vegetables | 6T2 | |
| 5T3 Plants | 5T3 Herbaceous | 5T4 Green Vegetables | 6T1 | |
| 5T3 Plants | 5T3 Herbaceous | 5T4 Green Vegetables | 5T4 Broccoli |  |
| 5T3 Plants | 5T3 Herbaceous | 5T4 Green Vegetables | 5T3 Collards |  |
| 5T3 Plants | 5T3 Herbaceous | 5T4 Green Vegetables | 5T2 | |
| 5T3 Plants | 5T3 Herbaceous | 5T4 Green Vegetables | 5T1 | |
| 5T3 Plants | 5T3 Herbaceous | 5T4 Green Vegetables | 4T4 | |
| 5T3 Plants | 5T3 Herbaceous | 5T3 Root Vegetables | 6T3 | |
| 5T3 Plants | 5T3 Herbaceous | 5T3 Root Vegetables | 6T2 | |
| 5T3 Plants | 5T3 Herbaceous | 5T3 Root Vegetables | 6T1 White Potato | 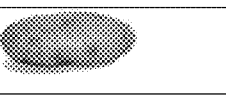 |
| 5T3 Plants | 5T3 Herbaceous | 5T3 Root Vegetables | 5T4 Sweet Potato | 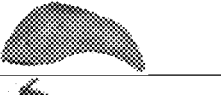 |
| 5T3 Plants | 5T3 Herbaceous | 5T3 Root Vegetables | 5T3 Carrot |  |
| 5T3 Plants | 5T3 Herbaceous | 5T3 Root Vegetables | 5T2 Onion |  |

FIG 14: Training method Step 1
*carrot*
FIG 15: Training method Step 2
*Kandula [receives] a carrot*
FIG 16: Training method Step 3
*Kandula gets (receives possession of) a carrot*

FIG 17: Training method Step 4
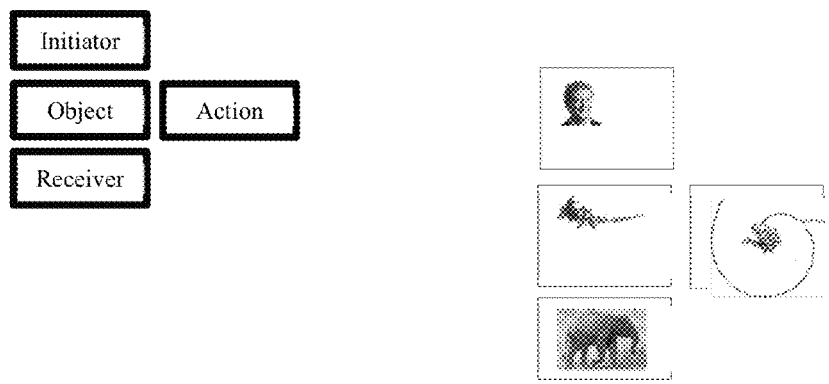
*John gives (transfers possession of) Kandula a carrot.*

FIG 18: Phase One screen shot
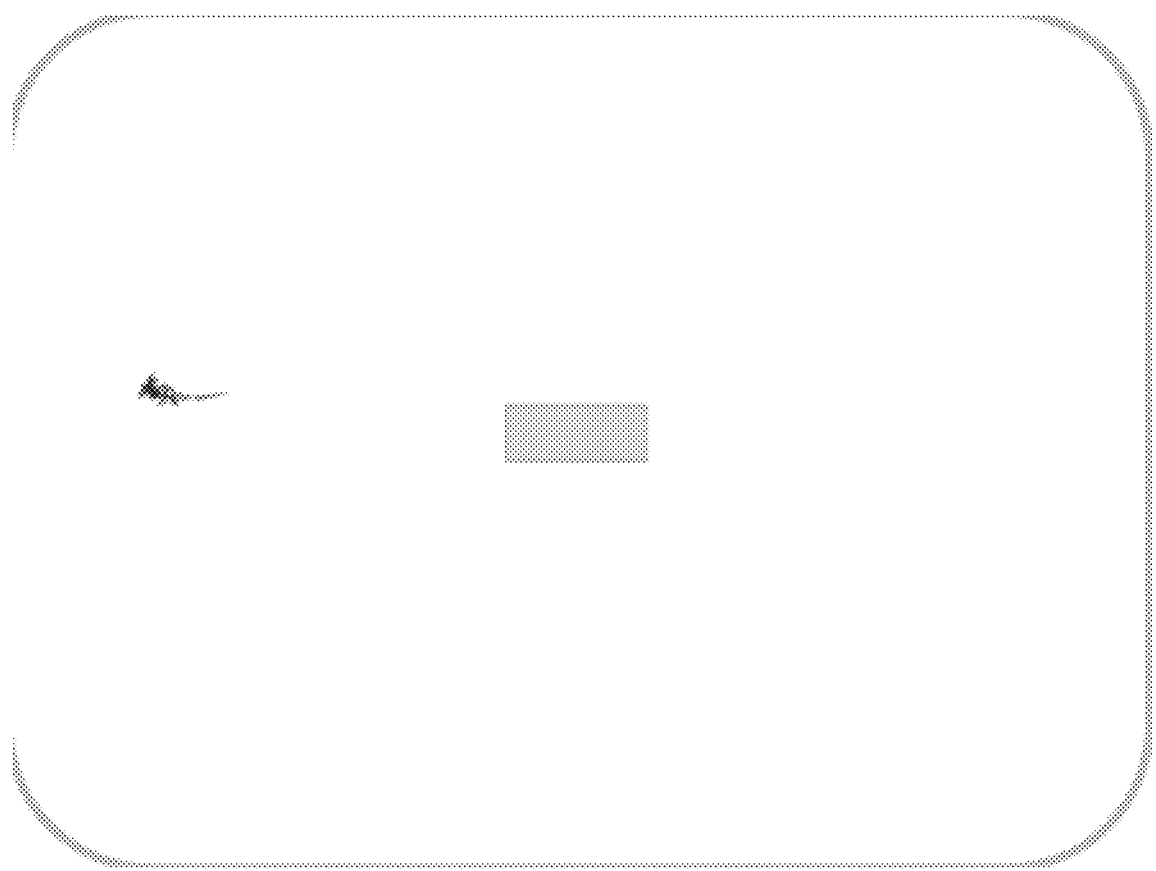

FIG 19: Phase two screen shot
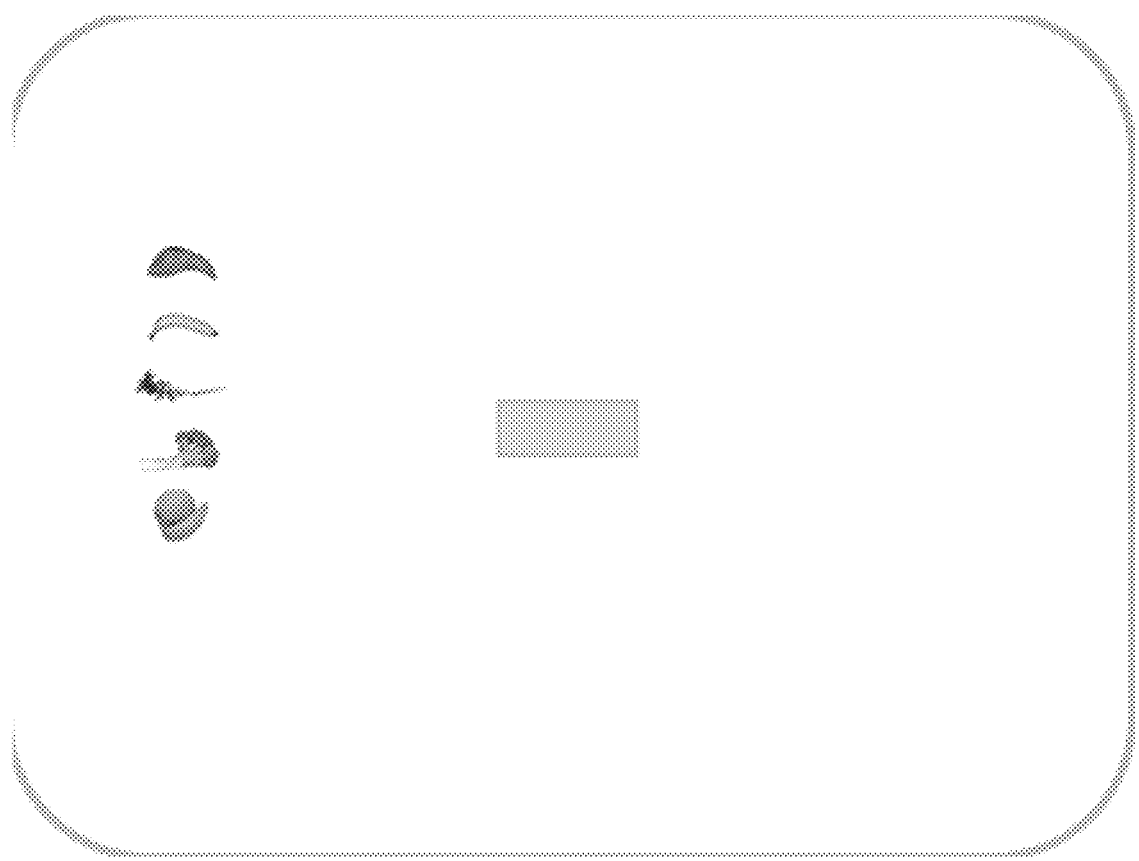

FIG 20: Phase Three screen shot
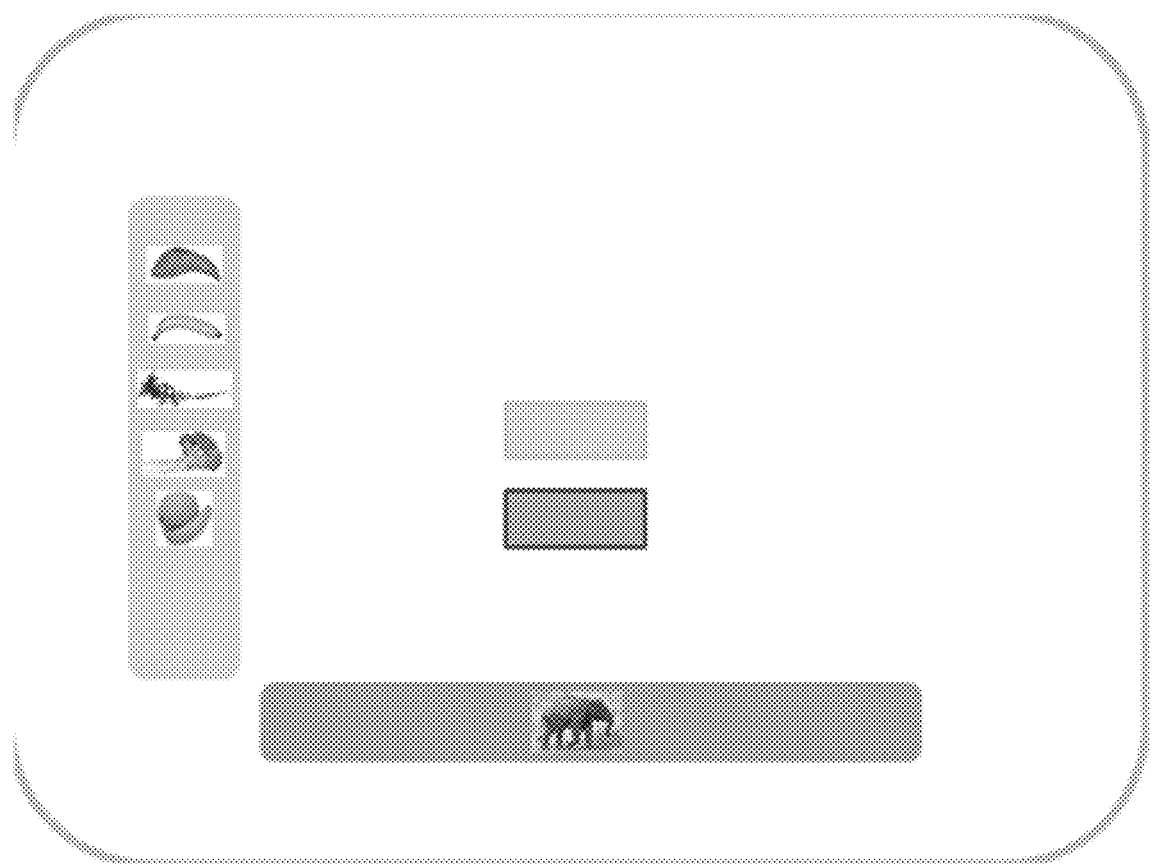

FIG 21: Phase Four screen shot
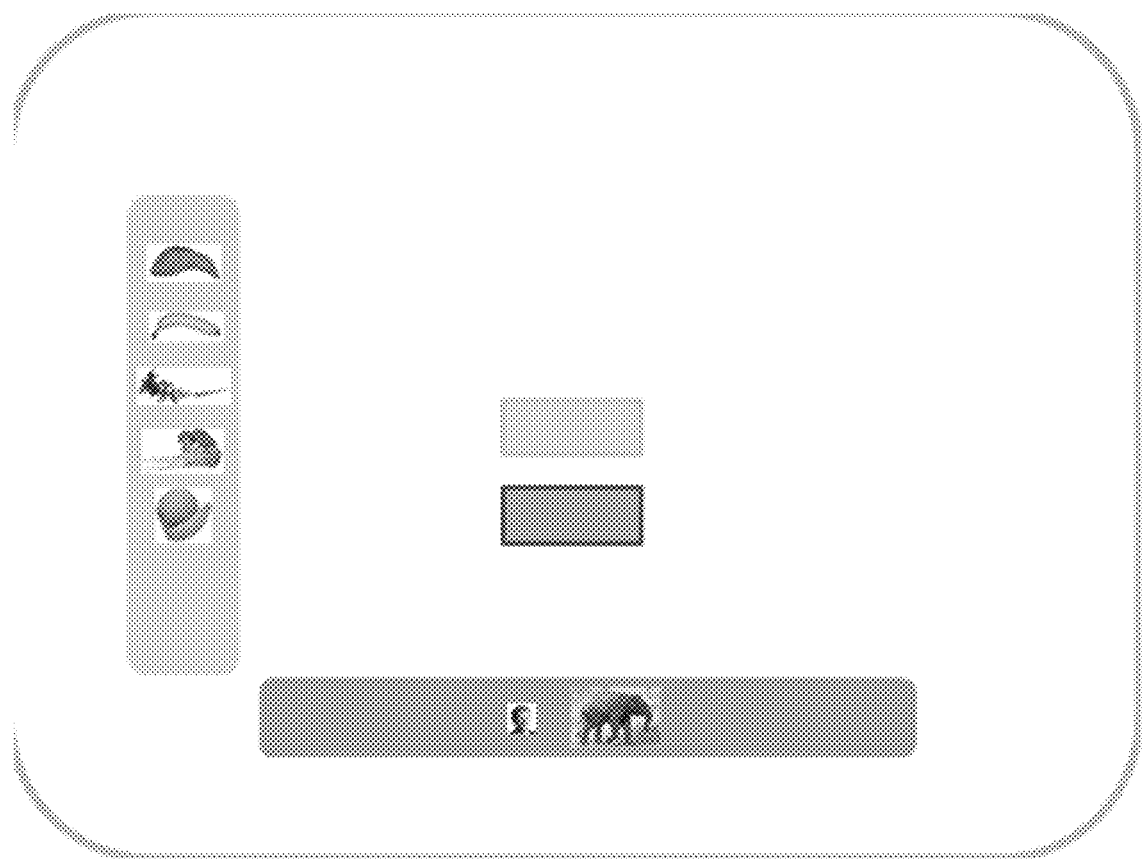

FIG 22: Phase Five screen shot
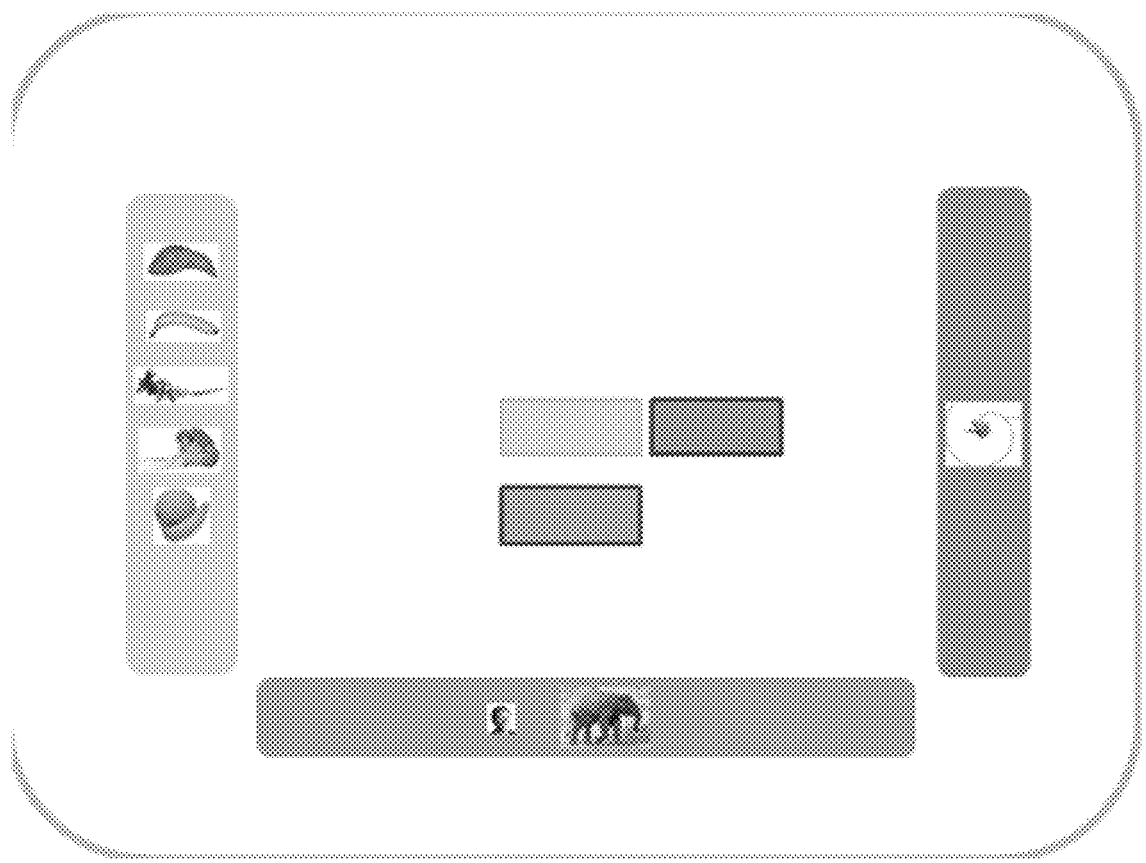

INTERSPECIES LANGUAGE WITH ENABLING TECHNOLOGY AND TRAINING PROTOCOLS

CROSS-REFERENCE TO RELATED APPLICATIONS

This patent application claims the benefit of the provisional patent application (EFS ID: 12341241, Application Number: 61/612,870) filed on Mar. 19, 2012, entitled: "Interspecies Language with enabling technology and training protocols."

BACKGROUND OF THE INVENTION

There have been many attempts over the years to communicate with animals. In the area of language, many people have taught an animal to recognize certain human word commands. In rare cases, animals are reported to have learned up to one hundred human words. Despite their apparent ability to associate some words in human language with objects or actions, however, no animal has been able to communicate back to humans with irrefutable meaning. More recently, researchers have provided animals with computers and printed symbols with which they can respond. However, these responses have been unstructured so that their meaning is not clear. While researchers have attributed certain meaning to them, it has been impossible to know it that meaning came from the animal or the researcher.

The ISL provides a structured language, along with its enabling apparatus and method, through which an animal or human) can respond with unequivocal meaning.

BRIEF DESCRIPTION OF THE PRIOR ART

Experiments have been conducted for some time that attempt to teach animals a human language. These have been conducted aurally using spoken words and visually using symbols either on cards or on a computer keyboard. Using these methods, there is evidence that some animals have learned to correctly interpret some human language words. In addition, some animals have learned to respond, using either American Sign Language (ASL) or the symbols on the card or keyboard. The central problem, argued by Herbet Terrace (*Science* 206 (4421): 891-902) and other linguists, is that the animals' responses lack syntax and do not constitute true language. These linguists point out that the animal is simply making a learned response to a cue (e.g. word or gesture) from the researcher and that the meaning ascribed to the symbols or gestures provided by the animal is most likely created by the researcher rather than the animal. There is an unrelated field of animal language research in which scientists have attempted to decode the natural communication of animals in the wild. There is also a keyboard communication device designed to facilitate communication between a dolphin and as human (5392735, February 1995, Xitco et al). The dolphin keyboard is unrelated to this patent application, because it is for a keyboard device that has no similarity to the enabling technology in this application.

The Interspecies Language (ISL) resolves the problem of an ambiguous response by providing a structured language with supporting technology and training protocols that enables animals to respond with an unequivocal syntax. The ISL provides a system of sophisticated two-way communication between humans and animals, humans and humans, or animals and animals that transcends prior art and differentiates it from previous attempts to communicate with animals using symbols or a human language.

BRIEF SUMMARY OF THE INVENTION

The Interspecies language (ISL) is a method for communicating that includes a visual language, a tonal language, a method for integrating them, a training protocol, and an enabling apparatus.

The ISL visual language communicates through a display that creates a "picture" of a sentence on a touchscreen. This visual display embodies the ISL's syntax and structures how the user employs it to build sentences. Sentences are constructed by dragging icons, which are pictures or abstract images representing objects or concepts, into the structured areas of the visual array. The visual language includes a method of using it that begins with a very simple one-image "sentence" and progresses to sentences with all the complexity of a human language.

The ISL tonal language communicates through a structured series of tones that are grouped so that tones within a grouping are members of a class of objects or concepts. The tones are sounded when an icon is placed into the visual array in the course of building a sentence. The tonal language can also be used alone with the tones being sequenced in the same order used to construct a sentence in the visual language. The student is trained in a sequence of steps that begin with the simple naming of an object (generally food) by dragging its icon into the array on the touchscreen and providing the named object.

The ISL is deployed through an apparatus that includes a touchscreen, computer, chute, and industrial controls. In addition to enabling the language itself, this apparatus allows the user to carry out the meaning of some sentences by making the appropriate action occur, such as opening a door or turning on a light. With its clear structure for the animal's response, the ISL provides a method through which meaningful, two-way communication between animals and humans, humans and humans, or animals and animals can occur.

BRIEF DESCRIPTION OF THE FIGURES

FIG. 01 is a block diagram showing the interconnection between the individual pieces of equipment that make up the enabling apparatus for the ISL.

FIG. 02 is a block diagram shows the ISL's structure as it is instantiated in a spatial array.

FIG. 03 is a block diagram shows the English word type associated with each structural element of the spatial array.

FIG. 04 is a screen shot of the computer-generated display on the touch screen ready for sentence construction.

FIG. 05 is a screen shot of the computer-generated display on the touch screen showing Step 1 in constructing a sentence FIG. 06 is a screen shot of the computer-generated display on the touch screen showing Step 2 in constructing a sentence FIG. 07 is a screen shot of the computer-generated display on the touch screen showing Step 3 in constructing a sentence FIG. 08 is a screen shot of the computer-generated display on the touch screen showing Step 4 in constructing a sentence FIG. 09 is a screen shot of the computer-generated display on the touch screen showing the addition of an object modifier FIG. 10 is a screen shot of the computer-generated display on the touch screen showing the addition of further modifiers FIG. 11 is a screen shot of the computer-generated display on the touch screen showing a sentence wherein the initiator is the object FIG. 12 is a screen shot of the computer-generated display on the touch screen showing a sentence wherein the initiator acts on itself FIG. 13 is a sample of the tonal language vocabulary FIG. 14 depicts Step 1 of the training method FIG. 15 depicts Step 2 of the training method FIG. 16 depicts Step 3 of the training method FIG. 17 depicts Step 4 of the training method FIG. 18 is a screen shot of Phase One of the training protocol FIG. 19 is a screen shot of Phase Two of the training protocol FIG. 20 is a screen shot of Phase Three of the training protocol FIG. 21 is a screen shot of Phase Four of the training protocol FIG. 22 is a screen shot of Phase Five of the training protocol

DETAILED DESCRIPTION OF THE INVENTION

The interspecies language (ISL) is a method for communicating that includes a visual language, a tonal language, a method for integrating them, a training protocol, and an enabling apparatus.

The ISL visual language communicates through a display that creates a "picture" of a sentence on a touchscreen. This visual display embodies the ISL's syntax and structures how the user employs it to build sentences. Sentences are constructed by dragging icons, which are pictures or abstract images representing objects or concepts, into the structured areas of the visual array. The visual language includes a method of using it that begins with a very simple one-image "sentence" and progresses to sentences with all the complexity of a human language.

The ISL tonal language communicates through a structured series of tones that are grouped so that tones within a grouping are members of a class of objects or concepts. The tones are sounded when an icon is placed into the visual array in the course of building a sentence. The tonal language can also be used alone with the tones being sequenced in the same order used to construct a sentence in the visual language. The student is trained in a sequence of steps that begin with the simple naming of an object (generally food) by dragging its icon into the array on the touchscreen and providing the named object.

The ISL is deployed through an apparatus that includes a touchscreen, computer, chute, and industrial controls. in addition to enabling the language itself, this apparatus allows the user to carry out the meaning of some sentences by making the appropriate action occur, such as opening a door or turning on a light. With its clear structure for the animal's response, the ISL provides a method through which meaningful, two-way communication between animals and humans, humans and humans, or animals and animals can occur.

The detailed description of the ISL below presents it in four sections:

1.0 Apparatus description 2.0 Method of communicating using the visual language 3.0 Method of communicating using the tonal language 4.0 Method of training a student to use the language Throughout the Detailed Description of the Invention, elephants are used as an example of the animal learning the language. This applies equally well to other animals and humans. The ISL is a communication system that stands in its own right and may be used for any manner of human-to-animal, human-to-human, or animal-to-animal communication.

1.0 Apparatus Description

The apparatus for using the ISL consists of a touchscreen, computer, industrial controls, and a chute. While the ISL could also be used simply with a printed array of boxes and a set of printed icons that could be placed in them, this apparatus allows the ISL to take physical action through industrial controls activated by the computer and to transmit the language electronically. FIG. 01 shows a picture of the apparatus.

1.1 Touchscreen

The apparatus includes a touchscreen, which is the primary medium for displaying the ISL. When the ISL is being used to communicate with large animals such as elephants, it is a large (approximately 3'×5') touch-screen display that allows icons that are pictures of objects to be approximately the same size as the actual object. This not only facilitates recognition of the icon, it also provides a drag-and-drop motion that mimics the elephant's natural motion in moving such a physical object. The display on the touchscreen is created by an attached computer that is preprogrammed to respond when objects are dragged into a specific box on the display.

1.2 Computer Creation of the Array

The apparatus includes a computer that is used to create an image of the language on the touchscreen and translate the user's actions into electronic code. FIG. 04 shows the display that is generated by the computer. The display includes the boxes shown conceptually in FIG. 02 along with examples of icons that can be used in each structural element ("box") displayed in holding areas associated with that structural element.

1.3 Tone Generator

The apparatus includes a tone generator that sounds the tones of the words in the ISL tonal language. The tones used are those of a western scale and may be sounded manually on a keyboard or be generated automatically by the computer in response to an icon being dragged into the appropriate portion of the touchscreen's array.

1.4 Computer Response to the User's Actions

When an icon is dragged into the appropriate box, the computer responds by generating the associated tonal word in the ISL tonal language and may trigger additional code to operate industrial controls.

1.5 Industrial Controls

When icons representing actions such as opening a window or turning on a light are dragged into the appropriate boxes on the touchscreen display, the computer initiates industrial controls to perform those actions such as opening a door, turning on the lights, or turning on a water valve. This not only enables the user to take real-world action using the ISL, it provides a primary motivation for animals using the ISL in a captive environment to learn it,

1.6 Chute

The apparatus includes a chute that is attached to the hack of the touch-screen display and ends at a tray. When animals are being trained to use the ISL, food and other objects are delivered to them through the chute in response to the animal's dragging the appropriate icon into its box. For example, when a carrot is dragged into the Object box, a carrot is placed into the chute and is delivered to the animals on the tray.

2.0 Method of Communicating Using the Visual Language

2.1 ISL Visual Language Structure

The Interspecies Language (ISL) is a method for communicating that includes a language structure and syntax that is instantiated in a spatial array. This visual array encodes the syntax of the ISL. by defining a specific area on the display for each structural element of the language. Sentences are created by placing icons that represent concepts or words in the appropriate areas of the display. A sentence is created by placing the icons in a specified order.

2.1.1 Visual Array

The ISL is presented as a visual array. While it can be presented in any medium, it is best used with the touchscreen apparatus described below in Section 2.0. The ISL is displayed on the touchscreen as a spatial array of boxes, with each box having a specific role in the linguistic structure of the language. FIG. 02 shows the spatial array as boxes.

2.1.2 Structural Elements of the Language

FIG. 02 displays the areas of the language display and identifies each with its function. They begin in the center with the "Object" box and are listed below. FIG. 03 displays the English word types (e.g. noun, verb, adjective) typically associated with each ISL structural element. The English word types do not always hold, however. For example, an English noun might be used in one of the characterization boxes to further characterize another noun in one of the primary (e.g. object, receiver, initiator) boxes.

- Object: The Object box contains the icon for that thing which is changed by the action in the sentence. in the sentence "Fred gives Susie a ripe apple" for example, the apple is the "object."
- Receiver: The Receiver box contains the icon for that person or thing that receives the object or the result of the action. In the sentence above, that is Susie and an icon representing. Susie would be placed in the Receiver box.
- Receiver Characterization: The Receiver may also be further characterized. If Susie was happy about getting the apple, then the icon for "happy" would be placed in the Receiver Characterization box. In English, the sentence might now be written: "Susie happily took the apple from Fred." This also demonstrates that icons that represent concepts may be translated differently in English, depending on the context. The icon used here means "To transfer possession of." That could be translated either as "Fred 'gives' Susie the apple" Of "Susie 'took' the apple from Fred."
- Action: The Action box contains the icon representing the action taken on the icon. In the sentence above, the icon for "transfer possession" ("gives") would be placed in the Action box.
- Action Characterization: The Action Characterization box contains the icon that further describes or modifies the action. This is generally an adverb in English. For example, if Fred slowly gives Susie the apple, the icon for "slowly" would be placed in the Action Characterization box.
- Initiator: The Initiator box contains the icon representing the person or thing that initiated the action. In our example here, an icon representing "Fred" is placed in the Initiator box. This would generally be either Fred's picture or an abstraction of the picture.
- Initiator Characterization: The Initiator Characterization box contains the icon that further describes the Initiator. This is typically an adjective in English. If Fred were wearing a hat, however, an icon of a hat would be placed in the Initiator Characterization box, because it further describes Fred.
- Object Characterization: The Object Characterization boxes contain the icons that further describe the object in the sentence. If Fred gave Susie a beautiful, ripe apple for example, the icons for "beautiful" and "ripe" would be placed in the Object Characterization boxes.

There may be multiple icons used in any of the boxes. If Susie were both happy and smiling, icons for "happy" and "smiling" would both be placed in the Receiver Characterization box.

2.1.3 Sentence Creation

Sentences are created by placing meaningful icons that represent words or concepts in some or all of the boxes on the spatial display. The filled boxes are a visual depiction of the "sentence."

A "sentence" in the ISL is a meaningful communication, which may not be a complete sentence in English. For example, if my finger hurt, I might place the icon for "finger" in the Object box and the icon for "pain" in the Object Modifier box. This could be a complete ISL sentence.

2.1.4 Conceptual Framework for Sentences

In the ISL, the object is the conceptual anchor of a sentence with initiators, receivers, actions, and descriptors arrayed around it. Sentences are begun by placing an icon in the object box first. This has a unique advantage in teaching the ISL, because it can be taught very simply in the beginning be defining objects and then building further meaning around them. The very first lesson is simply dragging an icon into the Object box to identify and object, such as an apple.

The language is structured to build as a child builds language. It begins with the object in the center, just as a child first learns a small vocabulary of nouns (e.g. Mama, cup, spoon) and builds Out from there. The object that is described or transformed is at the visual center of the language with all those things describing or acting upon it arrayed around it in a fixed pattern that embodies the sentence structure and relationship between the words. Each modifier is spatially associated with the noun or verb that it modifies. The advantage is that this sentence structure can be learned one word at a time and still make sense. It follows a baby's pattern of learning language beginning with nouns and later adding verbs and modifiers. It is built more as a picture of the event than a linear spoken sentence with objects being moved from the vocabulary area to each of the boxes on the touch-screen. Any box can be left blank.

2.1.5 The Box Determines the Icon's Meaning

When an icon is dragged into a specific box in the spatial display, its meaning in the sentence is determined by the structural element ("box") to which it is assigned. If the icon representing "fast movement" is placed in the Action Characterization box, for example, it means that the action is happening quickly. If the icon representing "fast movement" is placed in the Receiver Characterization box, however, it means that the receiver is moving quickly while the action is taking place. In our previous example, if Fred held out the apple to give it to Susie and she grabbed it while running past, it is Susie who is moving quickly while Fred is simply holding the apple still. In that case, the "fast movement" icon characterizing, Susie, not the action of giving.

In an additional example, placing the icon for "John" in the initiator box means that "John" is taking an action placing the icon for "John" in the receiver box means that "John" is receiving the action; and placing the icon for "John" in the object characterization box expresses John's possession of the object. Similarly, the word symbol for "move" in the action box is a transitive verb signifying movement of the object while "move" in the object characterization box indicates that the object being referred to is the object that had been moved. This spatial sentence structure facilitates the expression of complex meaning through the relationships of words while using a relatively limited set of symbols. It eliminates many of the connector words used in human languages such as "is", "the", "to", and "from" that establish the relationships between words.

2.2 Method of Using the ISL

Using the ISL (from the user's point-of-view) consists of a series of actions to use the touch screen in building sentences. To build a sentence, icons are dragged into their boxes in a specified sequence. In a typical animal training environment, objects placed into the sentence are retrieved from the chute to carry Out the meaning of the sentence and help motivate the animal student. Our description in 3.0 uses an elephant as an example of an animal using the ISL. This is an example only and any animal or human would follow the same method in using it.

2.2.1 Dragging an Icon into its Box

The first step in using the ISL is to touch an icon in one of the holding areas on the screen and drag it into its respective language box. FIG. 04 shows the screen prior to the first step. FIG. 05 shows the screen after the first step. In this case, a carrot has been dragged into the Object box on the screen.

2.2.2 Delivery of Items Requested in a Sentence

The step of dragging a single icon into the Object box is the simplest form of a meaningful communication using the ISL. It announces the presence of the carrot object. This is concretely manifested by the teacher placing a carrot in the chute so that it slides down and appears on the tray for the student. In this animal training example, the carrot is also a reinforcing reward to encourage the elephant's continuing interest in using the ISL.

2.2.3 Word Order in Sentence Creation

Sentences in the ISL are built by dragging icons into the language areas of the touchscreen array in a particular order. That order is: object, object modifiers, receiver, receiver modifiers, action, action modifiers, initiator, initiator modifiers. This sequence. reinforces the ISL's structure that makes the object the conceptual center of the sentence. This process of creating a sentence is further illustrated in the following figures:

FIG. 06: Step 2, dragging au icon into the Receiver box (no modifiers)

FIG. 07: Step 3, dragging an icon into the Action box (no modifiers)

FIG. 08: Step 4, dragging an icon into the Initiator box (no modifiers)

FIG. 09: shows an icon in the Object Modifier box (This sample shows how the sentence would look with the presence of an Object Modifier. Sequentially, the object modifier would be placed following placement of the object.)

FIG. 10: shows additional modifiers in their respective boxes. (This sample shows how the sentence would look with the presence of multiple modifiers.)

2.2.4 Intransitive and Other Special-Case Sentences

The visual array of the ISL has special applications for intransitive verbs and actions on oneself. Since it is a visual picture of the sentence rather than a word-ordered sentence like English, the ISL has the additional advantage of handling these concepts simply without introducing an intransitive version of verbs.

Initiator as object: FIG. 11 shows the sentence structure when the initiator is also the object of the sentence. In FIG. 11, the initiator both stands up (stands himself up) and is hungry.

Initiator acting on self FIG. 12 shows the initiator acting on himself by raising his foot. Again, this concept is portrayed very simply by showing, the initiator's foot as the object being raised.

In a more complex example, John wants to go home. John is obviously the initiator. His action is to "want" rather than to actually "go." The central focus of his wanting is "home." "To go" is an expression of the nature of his wanting. ("To go" is expressed as a character that has the root symbol "moves" combined with a symbol that expresses "itself." Thus "to go" is to "move itself/ myself.") Therefore, the sentence is constructed with an icon of "home" in the Object box, "desires" in the Action box, "go" in the Action Modifier box, and "John" in the Initiator box 2.2.5 Remote Transmission The process of using the ISL includes transmitting the electronic images on the touchscreen from the computer in the apparatus to a computer in a remote location. This remote communication function allows users of the ISL in remote locations to communicate in real time.

3.0 Method of Communicating Using the ISL Tonal Language

The ISL has tonal language component built on the tones of as twelve-note scale. Four tones in each octave separated by thirds are used to provide sufficient separation that the tones may be easily recognized. The tour tones are the first, fourth, seventh, and tenth notes of each octave. The tones are arranged in a four-tier hierarchy that has a total of 2,065 possible words. A fifth tier will be added as required. The words within the hierarchy are grouped logically so that the tones in the upper tiers (e.g. tiers one, two, and three) represent logical groups of words. For example a three-tone sequence (tier three) is a logical group of the nine additional words created by adding the fourth tone (fourth tier) to it.

The octaves are named according to the octaves on a piano using "C" as the first note in the octave. Since the tones of the first octave are difficult for humans to distinguish, we begin our use of tones with the second octave on the piano. Its first tone is "2T1" (e.g. second octave, tone 1) is "C". The next tone, 2T2, would be the "E-flat" above it. The Detailed Description of the invention provides a full description of the aural language.

We expect the students to learn the aural language through long association of those tones with the symbols of the visual language. Its primary initial function will be as a marker denoting that a symbol has been dragged into the correct box in the structure of the visual language. It will also be used as a convenient way to translate human speech into sounds that the elephants can understand. Elephants can also use a keyboard equipped with tone buttons to generate the aural language, with or without the visual language.

3.1 Tones

The tonal language uses the four tones that are the minor thirds of a chromatic scale. These are notes 1, 4, 7, and 10 of each octave in the scale. Six octaves are currently used, so the language is initially made up of 24 tones. It first octave begins with the lowest "C" note on the piano. ISL uses the chromatic scale because equipment to produce the tones is easily available. ISL uses minor thirds because they are the best compromise between being far enough apart to be easily distinguishable and being close enough together to get a sufficient number of tones within the easily discernible hearing range for humans and many animals. Minor thirds are also a natural harmonic.

3.2 Word Structure

Each word is composed of four tones at present. An additional tone will be added as the four-tone level of complexity is mastered and additional words are needed. ISL assumes that a four-tone sequence is practical to memorize. A five-tone sequence would be too difficult to memorize at first, while a three-tone sequence would not provide a sufficient number of words for a sophisticated language. A tone is numbered by its octave and place within the octave, separated by a "T". Therefore, the first tone of the first octave beginning with the lowest "C" on the piano is 1T1. The second note is 1T2. The first note in the second octave is 2T1. For tone clarity, ISL uses Only Octaves two through six. Since tones that extend beyond the octaves easily audible to humans are not used, the language contains 2065 potential words, using, the four-tone sequence.

3.3 Reference Tone

ISL uses a reference tone (played as a long tone) at the beginning of each paragraph to establish pitch. All other tones are heard relative to the reference tone. The three reference tones (the three octave tones in the first level) are played at the beginning of any conversation in the order: 3T3, 5T3, 4T3, so that the last tone heard (F#) is the primary reference tone.

3.4 Language Construction Rules

The ISL tonal language is built on the following rules. FIG. 13 depicts a sample of the vocabulary built according to these rules.

In Level 1 of the ISL, each word has 4 tones, producing 2,065 words. As more complexity is required, the ISL will be expanded to level 2, with each word being composed of 5 tones.

The maximum difference between one tone and the next in the four-tone sequence is one octave. Consequently, each tone in the sequence has nine possible tones in the tonal place following it. Those nine tones are the preceding tone plus four tones above it and four tones below it.

The tones are arranged hierarchically, with each successive tone in a four-tone word representing a subcategory of the previous tone. For example. 5T3-X-X-X means all "plants", 5T3-5T3-X-X means all "herbaceous plants"; 5T3-5T3-5T3-X means all "root vegetables"; and 5T3-5T3-5T3-5T3 means "carrot". Similarly, 513-5T3-5T3-5T4 means "sweet potato".

Trailing null tones are silent. Thus, a more might have two tones followed by two silent null-tones and represent a category such as "herbaceous plants."

Words are separated by a "click" sound

The three reference tones (the three octave tones in the first level) are played at the beginning of any conversation in the order: 3T3, 5T3, 4T3.

During the training sessions, the tones for a word are played whenever that word is dragged into an appropriate box in the touch-screen sentence structure.

3.5 Categories of Words

The language is built on easily observable categories rather than scientific phylum or branches of genetic evolution. Basing, the categories on evolutionary branching would be ideal except that it doesn't match what we see every day and would be hard to learn. While the highest level categories will remain the same, third-tier categories may be adapted to different environments in different parts of the world. In addition, words not used in another region ma be dropped and new words put in their place in the fourth tier.

3.6 Tonal Inflection

Tonal inflection conveys many nuances of meaning (e.g. YOU ate the cake! You ATE the cakes! You ate THE cake? You ate the CAKE?) The ISL uses tonal inflection by making the emphasized word slightly louder than the others.

3.7 Role of the Tonal Language

While the aural language is a fully-developed language of its own, it is abstract and therefore easiest to learn through constant association with the visual language over a long period. At the same time, it is useful in the early steps of the visual language learning design as a marker. For example, when the carrot is moved into the box in the first step, the four-tone sequence will be sounded using a simple electronic piano keyboard. The sounding of the tones is a marker that the action of moving the carrot into the box is correct and results in a real carrot being provided, if the carrot is randomly dragged about and happens to pass into the box, this allows us to quickly mark the behavior by playing the tone as it passes through the box and provide the reinforcing reward.

Once individual tonal words are learned, it can be used for communication throughout the elephant compound. For example, the tonal words "walk" and "house" sounded sequentially on a loud speaker could call the elephants into the elephant house. It can be used to translate spoken English (or any other language) into ISL tones that would be understood by an elephant competent in the ISL.

4.0 Method of Training a Student to use the ISL 4.1 Learning the Visual Language The language is learned one step at a time with each step having a useful consequence. The first consequences are receiving food. The next phase of consequences is gaining control of the environment. The third phase of consequences is play and social interaction.

Step 1—Learning Nouns: When the picture of an object (e.g. carrot) is dragged into the central object box, a carrot is placed into the chute and comes out on a tray just below the screen. FIG. 14 depicts the touch screen display for Step 1, first Showing simply the empty object box and second showing the object box with a carrot dragged into it on the display.

Step 2—Associating an individual with the object: Once the student (i.e. the animal learning the language) is regularly receiving a specific food item when the item's icon (e.g. picture or abstract representation) is dragged into the "object" box, an additional box for "Receiver" is added. Now the food is not delivered until both boxes are filled. The student must drag the carrot icon (picture of a carrot) and the student's own icon (picture of the student (e.g. Kandula) into their appropriate boxes. FIG. 15 shows the touchscreen display during Step 2, first with the empty object and receiver boxes on the display and second after a carrot has been dragged into the object box and the icon representing the elephant Kandula has been dragged into the receiver box.

Step 3—Associating an action with the object: Once the student is regularly receiving a specific food item when the item's icon and the Receiver's icon are dragged into their respective boxes, an additional box for "Action" is added. Now the food is not delivered until all three boxes are filled. The student must drag the carrot icon, the student's icon, and the Action icon into their respective boxes. FIG. 16 shows the touchscreen display during Step 3, first with the empty object, receiver, and action boxes on the display and second after the icons for "carrot", "Kandula", and "receives possession or" have been dragged into their respective boxes.

Step 4—Associating an actor with the action: Once the student is regularly receiving a specific food item when the Object, Receiver, and Action icons are dragged into their respective boxes, an additional box for "Initiator" is added. Now the food is not delivered until all four boxes are filled. Now, the teacher hands the food to the student rather than having it appear on the tray below the chute. FIG. 17 shows the touchscreen display first at the beginning of Step 4 with the object box, receiver box, action box, and initiator boxes empty and second after icons for "carrot", "Kandula", "to receive possession of" and "John" have been dragged into their respective boxes.

Step 5—Addition of modifiers: Once the student is regularly receiving a specific food item when the Object, Receiver, Action, and Initiator icons are dragged into their respective boxes, additional boxes for modifiers are added. Now, the object, receiver, action, and initiator vary depending on the modifiers dragged into their respective boxes. When there are multiple modifiers, they radiate out from the word modified in order of decreasing importance. In this sentence, there being two carrots seems slightly more important than carrots being orange. However, this could easily be reversed if the color of the carrots was particularly important within the sentence's context. FIG. 10 is a screen shot of the display that shows a sentence with incorporating additional modifiers.

The steps in learning the visual language are further detailed in the training protocol described in Sections 4.2 through 4.7 below.

4.2 Training Protocol—Phase One—Single Object 4.2.1 Design of the Training Protocol The training protocol proceeds from the simplest use of the language to more complicated uses. It accustoms the student to the technology in a simple way before proceeding to more complex uses. It uses a training protocol in which the teacher is actively encouraging the subject to learn the ISL through demonstration or any other means that seems appropriate during each session.

4.2.2 Equipment

The protocol requires the following apparatus, all of which are commercially available.

Personal computer (PC) to generate the visual display

Large touch-screen linked to the PC to present an elephant-sized interactive communication interface Electronic piano keyboard or programmable tone generator to play the tonal marker 4.2.3 Phase One Activities Phase One consists of the following activities:

Set up the large touch-screen and its associated PC so that the elephant can touch the screen with its trunk but not damage the screen. The screen used may need to be mounted to a secure stand.

Present the student with the carrot icon and the box depicted below.

Demonstrate the movement of dragging the carrot to the box (at which time t le tone sequence for carrot is sounded and a carrot is placed on the tray.)

Encourage the student to explore the touch screen and move the carrot icon into the box Play the carrot tone sequence and place a carrot on the tray when the student drags the icon into the box Encourage the student to pick the carrot from the tray and eat it.

FIG. 18 is a screen shot of the display at the beginning of Phase One.

4.2.4 Phase One Conclusion

Phase One concludes when the student either drags the icon into the box consistently.

4.3 Training Protocol—Phase Two—Multiple Objects

Upon successful completion of Phase One, Phase Two expands the vocabulary and tests whether or not the student can use multiple icons.

4.3.1 Phase Two Goal

The goal of Phase Two is to the student to use multiple icons of food objects.

4.3.2 Phase Two Activities

Phase Two consists of the following activities:

Continue use of the Phase One experimental set-up and equipment

Present the student with five icons representing food objects (e.g. carrot, sweet potato, broccoli, banana, and cantaloupe).

Encourage the student to drag each icon into the box and receive the corresponding food item.

Play the appropriate tone sequence for each item as the icon is dragged into the box and place the corresponding object onto the student's tray.

Encourage the student to pick the food object from the to and eat it.

FIG. 19 is a screen shot of the display at the beginning of Phase Two 4.3.3 Phase Two Conclusion Phase two concludes when the student drags multiple icons into the box consistently.

4.4 Training Protocol—Phase Three—Objects and Receiver

Upon successful completion of Phase Two, Phase Three trains the student to differentiate between "object" icons and "receiver" icons. Phase Three introduces the simplest form of the ISL's sentence structure.

4.4.1 Phase Three Goal

The goal of Phase Three is to train the student to use both object icons and receiver icons.

4.4.2 Phase Three Activities

Phase Three consists of the following activities:

Continue use of the Phase Two experimental set-up and equipment

Present the student with the five object icons from Phase Two (e.g. carrot, sweet potato, broccoli, banana, and cantaloupe) plus a new "receiver" icon, which is a picture of the student.

Encourage the student to drag an object icon into the object box and the receiver icon into the receiver box.

Play the appropriate tone sequence for each item as the icon is dragged into the box.

Place the corresponding food item on the student's tray only after both an object icon and the receiver icon are dragged into their respective boxes.

Encourage the student to pick the food item from the tray and eat it.

FIG. 20 is a screen shot of the display at the beginning of Phase Three

4.4.1 Phase Three Conclusion

Phase Three concludes when the student drags an object icon and receiver icon into their respective boxes to receive the reward.

4.5 Training Protocol—Phase Four—Objects and Receivers

Upon successful completion of Phase Three, Phase Four trains the student to use multiple "object" icons and multiple "receiver" icons. Phase Four differentiates whether the student perceives the icon as a symbol for a specific object or is simply dragging any icon into its box for a generalized reward. During Phase Four, both the student and the teacher (when demonstrating) have the choice of providing the reward to either the student or the teacher. The frequency with which the student chooses between its own icon and the teacher's icon may indicate whether or not it understands that each receiver icon represents a specific individual.

4.5.1 Phase Four Goal

The goal of Phase Four is to train the student to use multiple object icons and multiple receiver icons.

4.5.2 Phase Four Activities

Phase Four consists of the following activities:
- Add a "teacher's tray" to the equipment so that both the student and the teacher can receive a reward.
- Present the student with the five object icons from Phase Two (e.g. carrot, sweet potato, broccoli, banana, and cantaloupe) plus a second receiver icon, which is a picture of the teacher.
- Encourage the student to drag an object icon into the object box and a receiver icon into the receiver box.
- Play the appropriate tone sequence for each item as the icon is dragged into the box.
- Place the corresponding food item on the student's tray after both an object icon is dragged into the object box and the student's icon is dragged into the receiver's box.
- Place the corresponding food item on the teacher's tray after both an object icon is dragged into the object box and the teacher's icon is dragged into the receiver's box.

FIG. 21 is a screen shot of the display at the beginning of Phase Four.

4.5.3 Phase Four Conclusion

Phase Four concludes when the student drags an object icon and receiver icon into their respective boxes to receive the reward and uses both receiver icons on occasion.

4.6 Training Protocol—Phase Five—Objects, Receivers, and Action

Upon successful completion of Phase Four, Phase Five adds the "action" box to the sentence structure and tests whether or not the student can successfully use it. Phase Five introduces an abstract symbol and significantly increases the complexity of the actions required to receive the reward. Phase Five introduces a very simple "sentence" that contains an object, an action, and a receiver of that action.

4.6.1 Phase Five Goal

The goal of Phase Five is to train the student to use multiple icons, multiple receiver icons, and an action icon.

4.6.2 Phase Five Activities

Phase Four consists of the following activities:
Use the same experimental equipment as Phase Five.
Present the student with screen images that include
- Three boxes—object, receiver, and action
- Five object icons from Phase Two (i.e. carrot, sweet potato, broccoli, banana, and cantaloupe)
- Two receiver icons from Phase Four (i.e. student and teacher)
- One action icon (i.e. "to receive" or "to take possession of")
- Encourage the student to drag an appropriate icon into each of the three boxes
- Play the appropriate tone sequence for each item as the icon is dragged into the box.
- Place the corresponding food item on the student's tray after all three boxes are appropriately filled and include the student's icon.
- Place the corresponding food item on the student's tray after all three boxes are appropriately filled and include the teacher's icon.
- Encourage the student to pick the food item from the tray and eat it.

FIG. 22 is a screen shot of the display at the beginning of Phase Five.

4.6.3 Phase Five Conclusion

Phase Five concludes when the student drags an appropriate icon into each of the three boxes to receive the reward.

4.7 Training Protocol—Succeeding Phases

Successful completion of Phase Five would be an encouraging sign that the student is beginning to understand the structure of the ISL. However, Phase Five does riot definitively show the student's comprehension, since Phase five could be completed by the student's filling each box using the nearest icon without understanding the true symbolic meaning of the icon. Expanding the student's use of the ISL (and ultimately verifying the students true understanding of the icons and their use) follows the same pattern of increasing complexity shown in phases one through five. Succeeding, phases will each add some of the following elements.
- Additional icons in each category
- Additional boxes of the language structure
- More sophisticated rewards As the succeeding phases progress, the more sophisticated rewards include:
- Gaining control over the elephant's captive environment by having the computer (or trainer) respond to the two icons "door" and "open" being dragged into the object and action boxes respectively by triggering industrial controls that open the door. Similarly, the student gains control over lights, water, and food selection.
- Interacting meaningfully with the trainer and other elephants by exchanging sentences that include instructions for the elephants to perform certain tasks and for the teacher/trainer to perform certain tasks.
- Providing simple computer games such as "pong" on the apparatus with the required equipment to play that game that has been modified for the elephant's physiology.
- Providing control of objects and the environment such as small vehicles controlled remotely by as joy stick for the student to deliver food to itself and its companions.

4.8 Role of the Aural Language In Training Protocol

While the aural language is a fully-developed language of its own, it is abstract and is best learned through constant association with the visual language. At the same time, it is useful in the early steps of the training protocol as a marker. For example, when the carrot is moved into the box in the first step, the four-tone sequence will be sounded using a simple electronic piano keyboard. The sounding of the tones is a marker that the action of moving the carrot into the box is correct and results in a real carrot being provided. If the carrot is randomly dragged about and happens to pass into the box, this allows us to quickly mark the behavior with the tones and provide the reinforcing reward.

4.9 Motivational Approach

While the training protocol uses simple food rewards in the very first step of the straining protocol, we assume that the ultimate motivations for learning the ISL are the pleasures derived from autonomy, mastery, play, and social relations. Therefore, our learning protocol is designed to provide those pleasures. In the examples used for this application, the learning environment is assumed to be a zoo or similar confined space in which opportunities for autonomy, mastery, play, and mental stimulation are often severely limited. While the ISL is first implemented in a fairly simple way, it becomes complex as the training protocol proceeds and is different from anything the student has experienced previously.

AUTONOMY: The early phase of learning provides food when the student identifies the food's symbol and drags it into the appropriate box in the sentence structure. This combines the pleasure of the food itself with the autonomy gained by being able to choose and receive the food chosen. The learning environment Uses language to provide the student with increased control over its environment. For example building the phrase "open the door" will cause the door to open.

MASTERY: Learning proceeds to progressively higher levels of complexity. Mastery creates greater autonomy and control of the student's environment.

PLAY: In addition to learning the language itself, our learning environment includes a variety of games that use the learning technology to relieve boredom. This enriches the zoo environment. In the process, the student becomes increasingly familiar with the technology.

SOCIAL INTERACTION: Mastery of the ISL creates greater meaningful interaction within the species and with other species. This enhanced social interaction is pleasurable in-and-of itself. It further reinforces learning and becomes interwoven with autonomy and mastery.

The invention claimed is:

1. A method of communicating, either in person or remotely, comprising:
   moving icons from a database of icons into a visual array where position in the visual array assigns syntactic meaning;
   sounding tonal sequences from a scale so that the tonal sequences represent words;
   teaching the method by presenting the parts of speech represented by the icons in the visual array in a specific order;
   electronically generating the icons and tonal sequences; and
   creating actionable electronic signals in response to a meaning inherent in the positioning of the icons and the tonal sequences sounded.

2. The method in claim 1, wherein the visual array comprises:
   creating the visual array on an electronic display screen that assigns syntactic meaning to each position of the array;
   providing the database of icons with assigned meanings to use in the visual array;
   displaying selected icons from the database of icons on the display screen outside of the array that can be used to build sentences; and
   selecting icons from those displayed outside of the visual array on the display screen and moving them into the visual array to create a sentence.

3. The method in claim 2, wherein the visual array's positions are comprised of an object position, a receiver position, an initiator position., an action position, and multiple descriptor positions with the object position at the center of the visual array as its conceptual anchor with the receiver position, the initiator position, the action position, and the descriptor positions arrayed around it.

4. The method in claim 2, wherein the sentence is created by placing the icons into the array in the order: object, object modifier, receiver, receiver modifier, action, action modifier, initiator, initiator modifier.

5. The method in claim 2, wherein the method is implemented through actions comprising at least one of:
   touching the electronic display screen on which the visual array is displayed;
   electronically generating the visual array and icons on the screen;
   sending electronic signals in response to a user moving icons that initiate production of tonal sequences; and
   sending electronic signals in response to the user moving one of the displayed icons that initiates an implementing activity.

6. The method in claim 2, wherein the meaning inherent in the pattern of icons moved into the visual array, which is expressed through the electronic signals generated, is implemented through actions comprising at least one of:
   translating the meaning into human speech;
   initiating electronic controls that modify the user's man-made environment; and
   initiating electronic controls that deliver objects named in the array to the user.

7. The method in claim 1, wherein the tonal sequences comprise:
   creating a vocabulary of words that each have an associated tonal sequence made of tones from the scale; and
   creating sentences by sounding the tonal sequence of words in a prescribed word-order.

8. The method of claim 7, wherein the vocabulary of words has a hierarchy of word classes wherein a single-tone word represents the class of words subtending it with the identical first tone, a two-tone word represents the class of words subtending it with the identical first two tones, a three-tone word represent the class of words subtending it with the identical first three tones, and additional tiers are similarly added as required.

9. The method of claim 7, wherein the tonal sequence for a word is sounded at the same time as the icon for that word is moved into the appropriate position in the visual array to create a parallel sentence with the tonal sequences.

10. The method in claim 7, wherein the method is implemented through actions comprising at least one of:
    electronically sounding, the tonal sequences; and
    touching keys that initiate the tonal sequences.

11. The method in claim 7, wherein the meaning inherent in the tones sounded, which is expressed through the electronic signals generated, is implemented through actions comprising at least one of:
    translating the meaning into human speech;
    initiating electronic controls that modify a user's man-made environment; and
    initiating electronic controls that deliver objects named in the array to the user.

12. The method in claim 1, wherein the teaching comprises:

identifying an object using the visual array and tonal sequences;
directing receipt of the object to a receiver using the visual array and tonal sequences;
identifying an action to be performed on the object using the visual array and tonal sequences;
identifying an initiator of the action using the visual array and tonal sequences; and
further characterizing the object, receiver, action, and initiator by adding modifiers with the visual array and tonal sequences.

13. The method of claim 12, wherein a teacher mirrors the order in which words are placed in the visual array when creating a sentence to reinforce a student learning that word order.

14. The method of claim 12, wherein a teacher reinforces a student's learning by successively incorporating positive consequences for correctly completing a step, comprising at least one of the following: receiving food, gaining control of the student's immediate man-made environment, playing a computer-generated game using the electronic display screen, and having increased social interactions with the teacher and other humans and animals.

* * * * *